C. F. MARSTON.
SELECTIVE CONTROLLING MECHANISM.
APPLICATION FILED MAR. 5, 1919.
1,305,143.
Patented May 27, 1919.
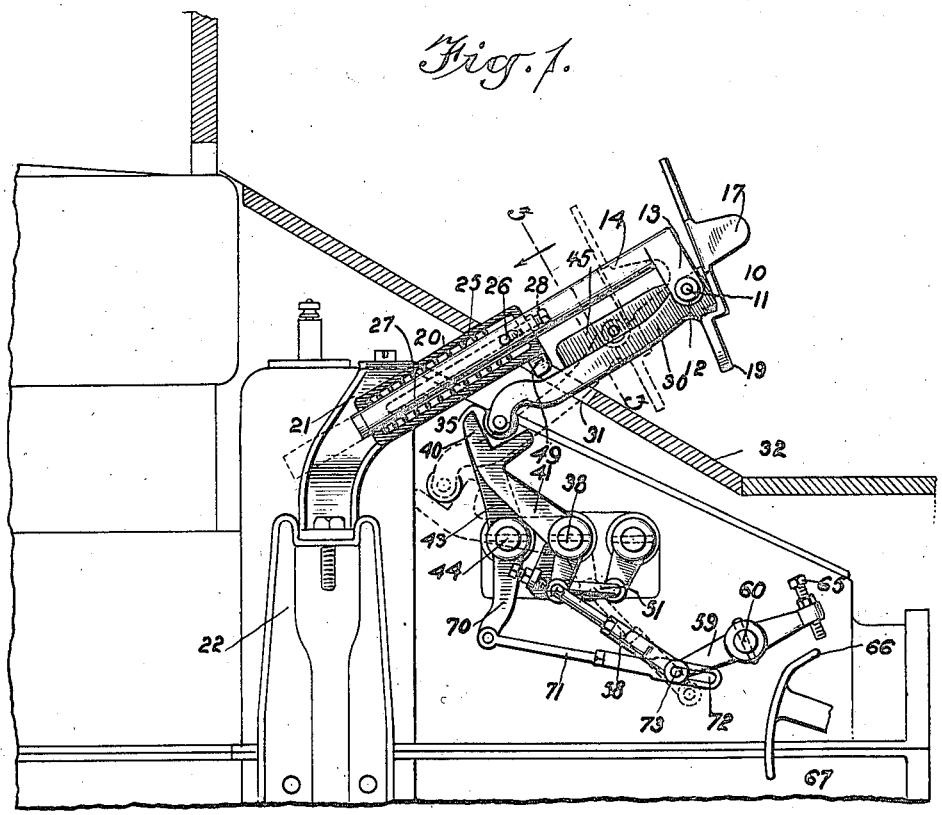
Fig. 1.
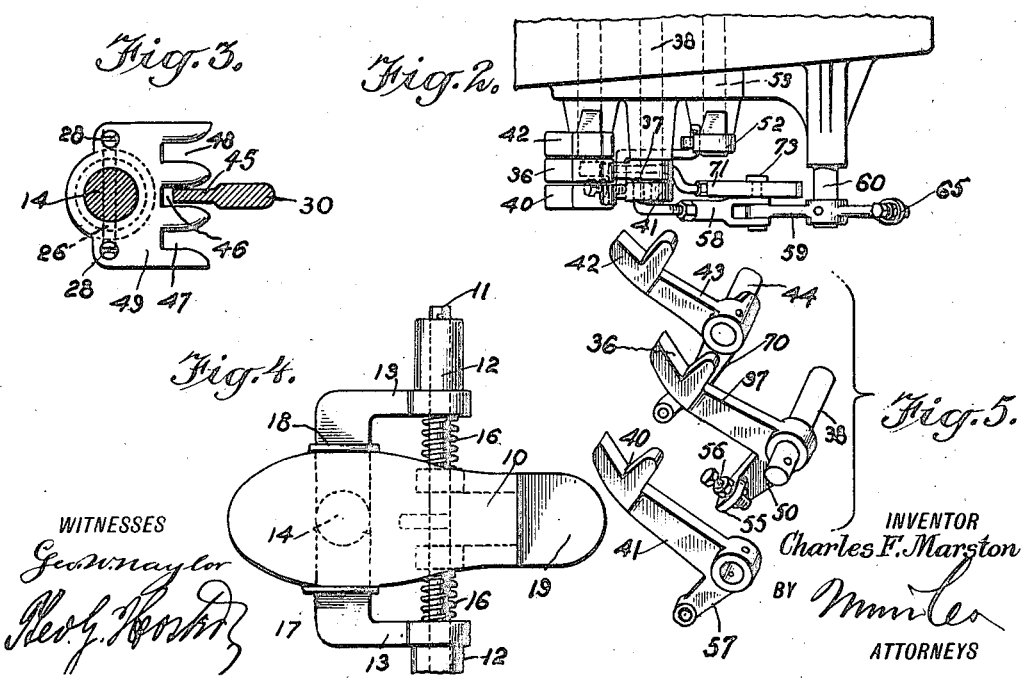
Fig. 3.  Fig. 2.
Fig. 4.  Fig. 5.
WITNESSES
Geo. W. Naylor
INVENTOR
Charles F. Marston
BY
ATTORNEYS

UNITED STATES PATENT OFFICE.

CHARLES F. MARSTON, OF BROOKLYN, NEW YORK.

SELECTIVE CONTROLLING MECHANISM.

1,305,143.   Specification of Letters Patent.   Patented May 27, 1919.

Application filed March 5, 1919. Serial No. 280,823.

*To all whom it may concern:*

Be it known that I, CHARLES F. MARSTON, a citizen of the United States, and a resident of the city of New York, borough of Brooklyn, in the county of Kings and State of New York, have invented a new and Improved Selective Controlling Mechanism, of which the following is a full, clear, and exact description.

The invention relates to selective controlling mechanism such as shown and described in the application for Letters Patent of the United States, No. 236,536, filed by me on May 25, 1918.

The object of the present invention is to provide a new and improved selective controlling mechanism more especially designed for use on automobiles, auto-trucks and similar power driven vehicles of the Ford or like type, and arranged to enable the operator in charge to readily actuate the gear shifting mechanism or the brake mechanism by the use of a single pedal. Another object is to provide an exceedingly simple construction and to allow of applying the selective controlling mechanism to Ford cars as now constructed.

With these and other objects in view the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a side elevation of the selective controlling mechanism arranged for actuating the gearset of a Ford automobile, parts being shown in section;

Fig. 2 is a plan view of part of the controlling mechanism;

Fig. 3 is an enlarged cross section of the selective controlling mechanism on the line 3—3 of Fig. 1;

Fig. 4 is an enlarged plan view of the pedal; and

Fig. 5 is a perspective view of the several levers controlled by the pedal and shown in disassembled position.

The pedal 10 of the selective controlling mechanism is mounted to swing and to slide sidewise on a pivot 11 held in the outer end of cylindrical casings 12 (see Fig. 4) attached to arms 13 on the upper end of a post 14. On the pivot 11 are coiled two springs 16 extending into the casings 12 and pressing opposite sides of the pedal 10 to normally hold the latter in a central position, that is, approximately midway between the casings 12 but to allow of shifting the pedal sidewise either to the right or to the left. In order to facilitate the sidewise movement of the pedal 10 the latter is provided near its forward end with side flanges 17 and 18 adapted to be engaged by the sides of the foot of the operator to permit the latter to slide the pedal to the right or to the left. The pedal 10 is also provided at its rear end with a heel rest 19 to permit of conveniently rocking the pedal in a forward or backward direction.

The post 14 extends in an upward and rearward direction and is mounted to slide in a bearing 20 formed on a bracket 21 attached to a support 22 fastened to the chassis of the automobile. Within the bearing 20 is arranged a spring 25 coiled around the post 14 and resting at its lower end on the bottom of the bearing 20. The upper end of the spring 25 bears against a transverse pin 26 extending through slots 27 formed in the sides of the bearing 20. The outer ends of the pin 26 abut against set screws 28 held adjustable on the top of the bearing 20 to permit of regulating the clearance between roller 35 and forked heads 40, 36 and 42 to allow for free lateral movement of the pedal when in normal position. It is understood that by the arrangement described the spring 25 normally holds the post 14 in uppermost position but allows the post 14 to slide downward and forward on the operator bearing down on the pedal 10.

From the under side of the pedal 10 extends downwardly and forwardly an arm 30 which together with the bearing 20 extends through an opening 31 formed in the footboard 32 of the automobile, as plainly shown in Fig. 1. The lower end of the arm 30 is provided with a friction roller 35 normally engaging a forked head 36 formed on the upper end of a lever 37 mounted to swing loosely on the low speed shaft 38 of the usual gearset of a Ford automobile. On shifting the pedal 10 to the left the friction roller 35 moves out of engagement with the head 36 of the lever 37 and moves into engagement with the forked head 40 on the upper end of a lever 41, pinned, keyed or otherwise fastened to the shaft 38. On shifting the pedal 10 from its normal midway position to the right, the friction roller moves into engagement with the head 42 of a reversing lever 43 secured on the reversing shaft 44 of the gearset. The arm 30 of the pedal 10 is provided in its upper end with a locking member 45 adapted to engage any one of a series of notches 46, 47 or 48 formed in a keeper 49 attached to or forming part of the fixed bearing 20. Normally the locking member 45 is out of engagement with the keeper 49 but when the pedal is pressed downward and forward when in central or midway position then the locking arm 45 engages the central notch 46 of the keeper 49 to hold the pedal 10 against sidewise shifting while in this pressed position (see Fig. 3). When the pedal 10 is shifted from midway or central position to the left and is then pressed downward and forward the locking arm 45 engages the notch 47 to hold the pedal against sidewise shifting after being in this pressed position. Likewise when the pedal is in central position and is shifted to the right and then pressed then the locking member 45 engages the notch 48 thus holding the pedal 10 against sidewise shifting while in this pressed position. It is understood that when the pressure is released on the pedal 10 after it had been pressed as above explained then the spring 25 returns the post 14 and with it the pedal 10 to normal uppermost position. The springs 16 return the pedal 10 to central, sidewise position.

The lever 37 is provided with an arm 50 connected by a link 51 with an arm 52 secured to the usual brake shaft 53 of a Ford or other automobile having a planetary transmission. The arm 50 of the lever 37 is provided with a sidewise extending lug 55 in which is adjustably held a set screw 56 adapted to engage an arm 57 formed on the lever 41. The arm 57 is pivotally connected by a link 58 with a lever 59 attached to the shaft 60 of the direct drive clutch. The lever 59 is provided with a set screw 65 adapted to be engaged by a cam 66 held on an arm 67 controlled by the usual emergency brake lever (not shown) of the automobile, but as this arrangement is common to Ford automobiles further description of the same is not deemed necessary.

In order to permit the operator to quickly change from high gear to reverse and vice versa, the following arrangement is made: The reversing lever 43 is provided with a downwardly extending arm 70 connected with an adjustable link 71 having an elongated slot 72 engaged by the pivot 73 connecting the link 58 with the lever 59. Normally the pivot 73 is in the forward end of the slot 72, as shown in Figs. 1 and 2, and hence the link 71 does not interfere with the ordinary working of the lever 59, but when the lever 43 is swung forward and downward the link 71 imparts a swinging motion to the lever 59 to turn the shaft 60 and thus actuate the direct drive clutch and hence it is not necessary for the operator to manipulate the emergency brake lever to actuate the cam 66 and lever 59.

The operation is as follows:

Presuming that the car is at a standstill with motor running, and it is desired to start the car forward, the operator moves the pedal 10 from its normal central position to the left, then presses the pedal forward a short distance, and then releases the emergency brake lever. The operator now forces the pedal 10 farther forward and downward thus causing the friction roller 35 to impart a swinging motion to the lever 41 which thus actuates the low speed shaft 38. The car is now started at a low speed and when it is desired to run the car at a high speed it is only necessary for the operator to release the pedal 10 to allow the spring 25 to return the pedal 10 to uppermost position and to allow the left hand spring 16 to return the pedal 10 to central position. During this movement the low speed shaft 38 is released and the high speed gear is thrown in to run the car at a high or engine speed. When it is desired to stop the car the operator presses down the pedal 10 a short distance, to cause the friction roller 35 to impart a swinging motion to the lever 37. The movement given to the lever 37 is transmitted by the set screw 56 to the arm 57 of the lever 41 whereby the direct drive clutch shaft 60 is actuated to release the direct drive clutch and by the action of the link 51 the lever 37 actuates the brake shaft 53 to apply the brake.

When desiring to reverse, the operator can either first actuate the emergency brake lever or directly shift the pedal 10 to the right and press it to engage the friction roller 35 with the head 42 of the lever 43 thereby imparting a swinging motion to the latter which actuates the reversing shaft 44, at the same time the link 71 causes the high speed clutch to rotate anti-clockwise thereby disengaging the high speed clutch prior to the complete contraction of the reverse band encircling the reverse planetary gear drum.

Having thus described my invention, I claim as new and desire to secure by Letters Patent:—

1. In a selective controlling mechanism, selective levers each operable to effect a change in the device on which the selective controlling mechanism is used, and a pedal adapted to be moved bodily up and down and to be shifted sidewise, the pedal having means adapted to engage a corresponding lever to actuate the latter.

2. In a selective controlling mechanism, a support mounted to slide up and down, a pedal mounted to swing and to slide sidewise on the said support and to impart a sliding motion to the latter, and selective and actuating members adapted to be engaged by the said pedal and controlling the devices to be actuated.

3. In a selective controlling mechanism, selective levers each operable to effect a change in the device on which the selective controlling mechanism is used, a spring pressed support mounted to slide up and down, and a pedal mounted to slide sidewise on the said support and having means adapted to engage either of the said selective levers to actuate the same.

4. In a selective controlling mechanism, a slidable support, a pedal mounted to slide sidewise on the said support and to actuate the latter, and selective levers each operable to effect a change in the device on which the selective controlling mechanism is used, the pedal having an arm fixed thereon and the said selective levers having heads either of which is adapted to be engaged by the said pedal arm.

5. In a selective controlling mechanism, a support mounted to slide, a spring pressing the support, a pedal mounted to slide sidewise on the said support and provided with an arm, and a series of levers having means adapted to be engaged by the said pedal arm, one of the said levers controlling a brake mechanism and a high speed mechanism, another controlling a low speed mechanism, and another controlling a reversing mechanism.

6. In a selective controlling mechanism, a support mounted to slide, a spring pressing the support, a pedal mounted to slide sidewise on the said support and provided with an arm, a series of levers having means adapted to be engaged by the said pedal arm, a slow speed mechanism having a shaft on which one of the said levers is secured, and another lever is mounted to swing loosely on the said shaft as a fulcrum, a reversing shaft on which another of said levers is secured, a brake shaft connected with the said loosely mounted lever, the latter having means adapted to engage the said slow speed shaft lever, and a high speed shaft connected with the said lever on the slow speed shaft.

7. In a selective controlling mechanism, a fixed bearing inclined upwardly and rearwardly, a post slidable in the said bearing, a spring within the said bearing and holding the said post normally in uppermost position, a pedal mounted to slide sidewise on the said post and provided with an arm extending downwardly and forwardly, a series of levers each operable to effect a change in the device on which the selective controlling device is used, each of the said levers being adapted to be engaged by the said pedal arm, a locking member on the said pedal arm, and a keeper fixed on the said bearing and adapted to be engaged by the said locking member on pressing the pedal to lock the latter against sidewise movement while being in pressed position.

8. In a selective controlling mechanism, selective high speed and reversing levers operable to effect corresponding changes in the device on which the selective controlling device is used, an engine speed shaft provided with a lever, a link pivotally connecting the said engine speed shaft lever with the said high speed lever, and a link connected with the said reversing lever and having a limited sliding connection with the said engine speed shaft lever.

CHARLES F. MARSTON.